United States Patent
Lin

(10) Patent No.: US 10,530,538 B2
(45) Date of Patent: Jan. 7, 2020

(54) HYBRID AUTOMATIC REPEAT REQUEST METHOD AND SYSTEM

(71) Applicant: INDUSTRIAL TECHNOLOGY RESEARCH INSTITUTE, Hsinchu (TW)

(72) Inventor: You-En Lin, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/854,677

(22) Filed: Dec. 26, 2017

(65) Prior Publication Data
US 2019/0165897 A1    May 30, 2019

(30) Foreign Application Priority Data

Nov. 24, 2017 (TW) .............................. 106140911 A

(51) Int. Cl.
*H04W 72/12* (2009.01)
*H04L 1/18* (2006.01)
*H04L 5/00* (2006.01)

(52) U.S. Cl.
CPC .......... *H04L 1/1854* (2013.01); *H04L 1/1822* (2013.01); *H04L 1/1887* (2013.01); *H04L 5/0053* (2013.01); *H04L 1/1819* (2013.01)

(58) Field of Classification Search
CPC ... H04L 1/1854; H04L 1/1887; H04L 5/0053; H04L 1/1822
See application file for complete search history.

(56) References Cited

U.S. PATENT DOCUMENTS 6,693,910 B2   2/2004  Chao
7,155,655 B2  12/2006  Cheng
(Continued)

FOREIGN PATENT DOCUMENTS

CN   102124685 B   6/2015
CN   105122668 A  12/2015
(Continued)

OTHER PUBLICATIONS

Sheshachalam et al., "A Novel HARQ Pooling Scheme for Improved Multi-Connectivity in 5G Cloud RAN", Globecom Workshops (GC Wkshps), 2016 IEEE, Dec. 4-8, 2016.
(Continued)

*Primary Examiner* — Phuc H Tran
(74) *Attorney, Agent, or Firm* — Maschoff Brennan

(57) ABSTRACT

A hybrid automatic repeat request method comprises selecting a first HARQ process group from HARQ process groups to send a first data packet, recognizing that a feedback signal corresponds to a first HARQ process in the first HARQ process group according to the feedback signal and the time of receiving the feedback signal, determining whether the last used HARQ process in the first HARQ process group is identical to the first HARQ process when the first data packet is decoded incorrectly, instructing the first HARQ process to transmit the first data packet when the two processes are different, and instructing the first HARQ process to transmit a second data packet or the first data packet when the two processes are identical, wherein the first data packet is based on a whole of the raw data, and the second data packet is based on a part of the raw data.

11 Claims, 8 Drawing Sheets

(56) References Cited

U.S. PATENT DOCUMENTS

| | | | |
|---|---|---|---|
| 7,895,494 | B2 | 2/2011 | Terry et al. |
| 8,271,844 | B2 | 9/2012 | Terry et al. |
| 8,291,276 | B2 | 10/2012 | Hong et al. |
| 9,497,682 | B2 | 11/2016 | Davydov et al. |
| 2010/0095183 | A1 | 4/2010 | Petrovic et al. |
| 2013/0343273 | A1 | 12/2013 | Barbieri et al. |
| 2014/0301297 | A1 | 10/2014 | Geirhofer et al. |
| 2015/0155978 | A1 | 6/2015 | Eriksson et al. |
| 2016/0105873 | A1 | 4/2016 | Gaal et al. |
| 2016/0323067 | A1 | 11/2016 | Jana et al. |
| 2017/0230147 | A1 | 8/2017 | Kroener |
| 2018/0123765 | A1* | 5/2018 | Cao .................. H04L 1/1861 |
| 2018/0234211 | A1* | 8/2018 | Liu .................... H04L 1/1812 |

FOREIGN PATENT DOCUMENTS

| | | |
|---|---|---|
| TW | 201625044 A | 7/2016 |
| WO | 2017/100096 A1 | 6/2017 |
| WO | 2017/136678 A1 | 8/2017 |

OTHER PUBLICATIONS

Kim et al., "CL-ARQ Efficient ARQ for Two-layer Retransmission Schemes", Proceedings of the International Conference on Wireless Communications and Mobile Computing, IWCMC 2007, Aug. 12-16, 2007.

Khalili et al., "Control-Data Separation in Cloud RAN: The Case of Uplink HARQ", Information Theory and Applications Workshop (ITA), 2016, Jan. 31-Feb. 5, 2016.

Huang et al., "Distributed MAC Scheduling Scheme for C-RAN with Non-Ideal Fronthaul in 5G Networks", Wireless Communications and Networking Conference (WCNC), 2017 IEEE, Mar. 19-22, 2017.

Gulati et al., "Performance Analysis of Centralized RAN Deployment with Non-Ideal Fronthaul in LTE-Advanced Networks"Vehicular Technology Conference (VTC Spring), 2016 IEEE 83rd, May 15-18, 2016.

Sayenko et al., "Performance Comparison of HARQ and ARQ Mechanisms in IEEE 802.16 Networks", Proceedings of the 11th International Symposium on Modeling Analysis and Simulation of Wireless and Mobile Systems, MSWiM 2008, Oct. 27-31, 2008.

TW Office Action in application No. 106140911 dated Aug. 14, 2018.

European Search Report in application No. 17210356.6 filed Jul. 10, 2018.

* cited by examiner

| Subframe | n | n+1 | n+2 | n+3 | n+4 | n+5 | n+6 | n+7 | n+8 | n+9 | n+10 | n+11 | n+12 | n+13 | n+14 | n+15 | n+16 | n+17 |
|---|---|---|---|---|---|---|---|---|---|---|---|---|---|---|---|---|---|---|
| eNB | H_0_0 | H_1_0 | H_2_0 | H_3_0 | H_4_0 | H_5_0 | H_6_0 | H_7_0 | H_0_1 | H_1_1 | H_2_1 | H_3_1 | H_0_0 | H_1_0 | H_2_0 | H_3_0 | H_4_0 | H_5_0 |
| UE | | | | | | NAK | ACK | ACK | ACK | ACK | ACK | ACK | ACK | ACK | ACK | ACK | ACK | ACK |

FIG. 8

HYBRID AUTOMATIC REPEAT REQUEST METHOD AND SYSTEM

CROSS-REFERENCE TO RELATED APPLICATIONS

This non-provisional application claims priority under 35 U.S.C. § 119(a) on Patent Application No(s). 106140911 filed in Taiwan, R.O.C. on Nov. 24, 2017, the entire contents of which are hereby incorporated by reference.

BACKGROUND

Technical Field

This disclosure relates to an automatic repeat request method, and more particularly to a hybrid automatic repeat request method.

Related Art

Long term evolution (LTE) and the fourth generation (4G) communication technologies are high-speed wireless communication protocols applied to mobile phones and data terminals in the current telecommunications. In these communication technologies, the application of a hybrid automatic repeat request (HARQ) provides a data retransmission mechanism with high efficiency. The HARQ combines the technologies of forward error correction (FEC) and automatic repeat request (ARQ), and includes transmitting data from a base station to user equipment and receiving a feedback signal from the user equipment to determine whether to retransmit the data.

Taking the HARQ in the LTE architecture as an example, please refer to FIGS. 1A-1C, wherein FIGS. 1A-1C are timing diagrams of the transmission of one or more data packets according to the related art. As shown in FIG. 1A, in the LTE architecture, an ideal time interval between the step of data transmission performed by a base station eNB and the step of returning a feedback signal performed by the user equipment UE is 4 subframes, and an ideal time interval between the step of returning the feedback signal performed by the user equipment UE and the step of retransmitting the old data or transmitting new data performed by the base station eNBu according to the feedback signal is also 4 subframes. Therefore, the HARQ involves in eight parallel HARQ process HP0-HP7 through frequency-division duplexing. These HARQ process HP0-HP7 start to transmit data from the base station eNB respectively in the subframes n–n+7, transmit feedback signals from the user equipment UE respectively in the subframes n+4–n+11, retransmit the old data or transmit new data from the base station eNB respectively in the subframes n+8–n+15, transmit feedback signals corresponding to the last transmitted data from the user equipment UE, and so on.

However, in practice, as shown in FIG. 1B, the base station eNB includes a medium access control layer eNB_MAC, a physical layer eNB_PHY and a wireless communication layer eNB_RF. When the medium access control layer eNB_MAC and the physical layer eNB_PHY have a communication connection therebetween via a fronthaul network FH, the frounthaul network FH must generate a latency L so that the HARQ process cannot complete a cycle in 8 subframes. For example, if the latency L occupies two subframes, the HARQ process HP0 firstly starts to transmit data from the wireless communication layer eNB_RF to the user equipment UE in the subframe n, and the user equipment UE returns an ACK signal in the subframe n+4 for asking for new data. Due to the latency L of the fronthaul network FH, the wireless communication layer eNB_RF cannot transmit new data until the subframe n+12. Because there are merely eight parallel HARQ processes HP0-HP7, the wireless communication layer eNB_RF and the user equipment UE must be in the idle state for 4 subframes as shown in FIG. 1C, so that the throughput in this case must be much lower than an ideal throughput.

Furthermore, when the central processing unit where the physical layer eNB_PHY is disposed has a low processing speed, a latency must be generated so that the throughput of the user equipment must be low.

SUMMARY

According to one or more embodiments of this disclosure, a hybrid automatic repeat request method for transmitting a piece of raw data comprises selecting a first HARQ process group from a plurality of HARQ process groups to send a first data packet, receiving a feedback signal in response to the first data packet, recognizing that the feedback signal corresponds to a first HARQ process in the first HARQ process group according to the feedback signal and the time of receiving the feedback signal, determining whether the feedback signal indicates that the first data packet is decoded incorrectly, determining whether the last used HARQ process in the first HARQ process group is identical to the first HARQ process when the first data packet is decoded incorrectly, instructing the first HARQ process to transmit the first data packet when the two processes are different, and instructing the first HARQ process to transmit a second data packet or the first data packet when the two processes are identical, wherein the first data packet is generated based on whole of the piece of raw data, and the second data packet is generated based on a part of the piece of the raw data.

According to one or more embodiments of this disclosure, a hybrid automatic repeat request system is configured for transmitting a piece of raw data, and comprises an undefined HARQ process group, a plurality of HARQ process groups and a coordinator wherein the coordinator is connected with the undefined HARQ process group and the plurality of HARQ process groups. The undefined HARQ process group is configured for storing a plurality of undefined HARQ processes. The coordinator selects a first HARQ process group from the plurality of HARQ process groups, assigns one of the plurality of undefined HARQ processes to the first HARQ process group to serve as a first HARQ process, and instructs the first HARQ process to transmit a first data packet. The coordinator is also configured to receive a feedback signal in response to the first data packet, determine that the feedback signal corresponds to the first HARQ process according to the feedback signal and the time of receiving the feedback signal, determines whether the feedback signal indicates that the first data packet is decoded incorrectly, determines whether the last used HARQ process in the first HARQ process group is identical to the first HARQ process when the feedback signal indicates the first data packet is decoded incorrectly, instructs the first HARQ process to transmit the first data packet when the last used HARQ process in the first HARQ process group is different from the first HARQ process, and instructs the first HARQ process to transmit a second data packet or the first data packet when the last used HARQ process in the first HARQ process group is identical to the first HARQ process, wherein the first data packet is generated based on the whole of the piece of raw data, and the second data packet is generated based on a part of the piece of the raw data.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 8 is a timing diagram of the transmission of data packet according to an embodiment of this disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 2A:
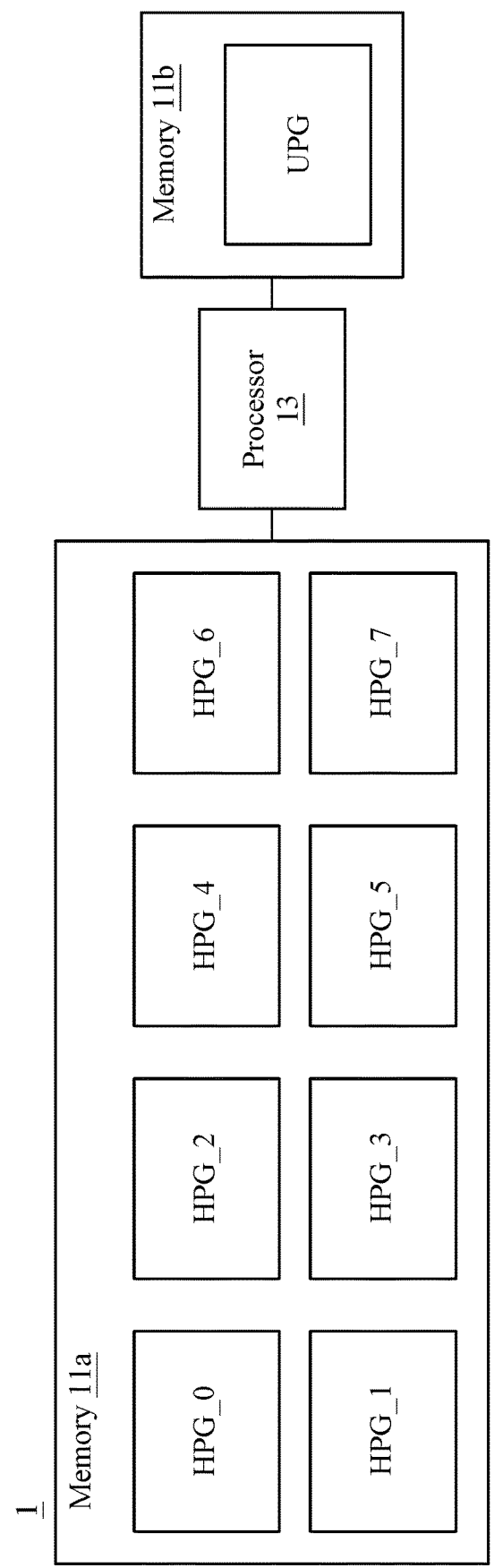
FIG. 2A is a function block diagram of a hybrid automatic repeat request system according to an embodiment of this disclosure.
Figure 2B:
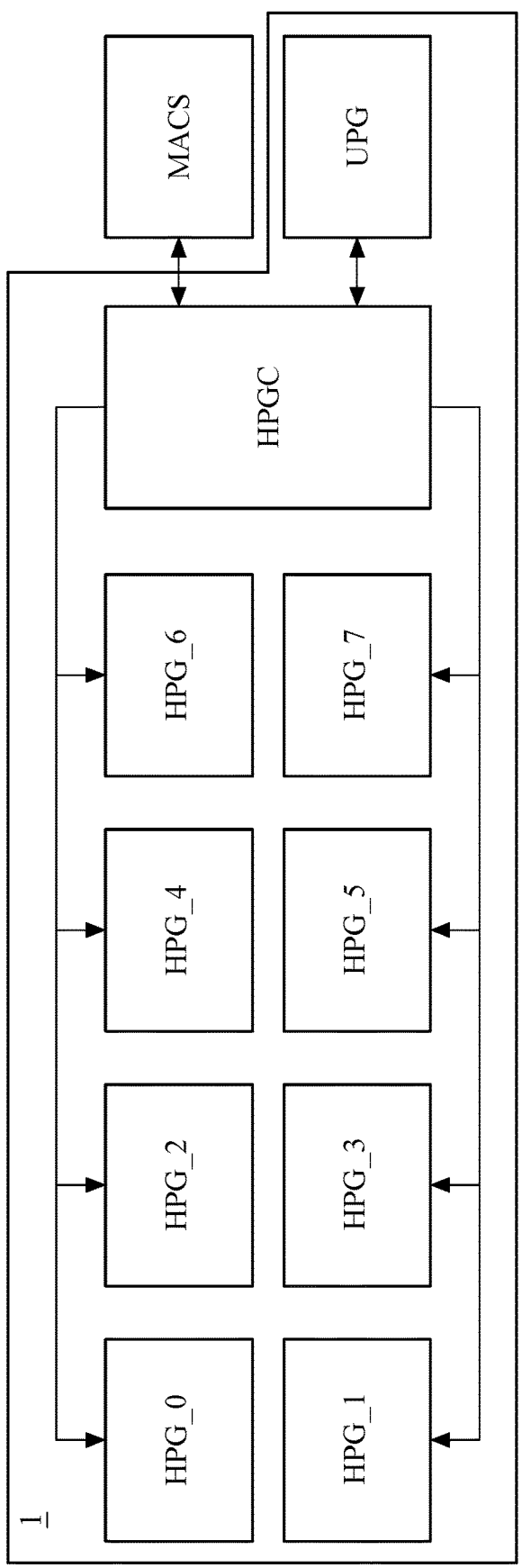
FIG. 2B is an architecture diagram of a hybrid automatic repeat request system according to an embodiment of this disclosure.

Please refer to FIGS. 2A and 2B wherein FIG. 2A is a function block diagram of a hybrid automatic repeat request system according to an embodiment of this disclosure, and FIG. 2B is an architecture diagram of a hybrid automatic repeat request (HARQ) system according to an embodiment of this disclosure. The HARQ system is applied to the base station in long-term evolution (LTE), the fourth generation (4G) communication technology or the fifth generation (5G) communication technology, and comprises at least one memory and a processor connected with each other. For example, as shown in FIG. 2A, the HARQ system 1 comprises two memories 11a and 11b and a processor 13, wherein the processor 1 is connected with the memories 11a and 11b. The memory 11a comprises an undefined HARQ process group UPG, the memory 11b comprises a plurality of HARQ process groups HPG_0-HPG_7, and the processor 13 serves as a coordinator. In another embodiment, the HARQ system 1 comprises one memory which comprises an undefined HARQ process group as well as a plurality of HARQ process groups. As shown in FIG. 2B, the coordinator HPGC has an electrical connection or a communication connection with the undefined HARQ process group UPG and the HARQ process groups HPG_0-HPG_7. Moreover, the coordinator HPGC is configured to have an electrical connection or a communication connection with a medium access control scheduler MACS.

The undefined HARQ process group UPG included in the memory 11a as shown in FIG. 2A is configured to store a plurality of undefined HARQ processes. In an embodiment, the quantity of the undefined HARQ processes inherently included in the undefined HARQ process group UPG is determined according to the round-trip time (RTT) of the communication technology to which the HARQ system 1 is applied. The formula for the quantity of the undefined HARQ processes is exemplified as follows:

$$\text{The quantity of undefined HARQ processes} = 8 + \frac{RTT}{1\ ms}$$

Figure 3:
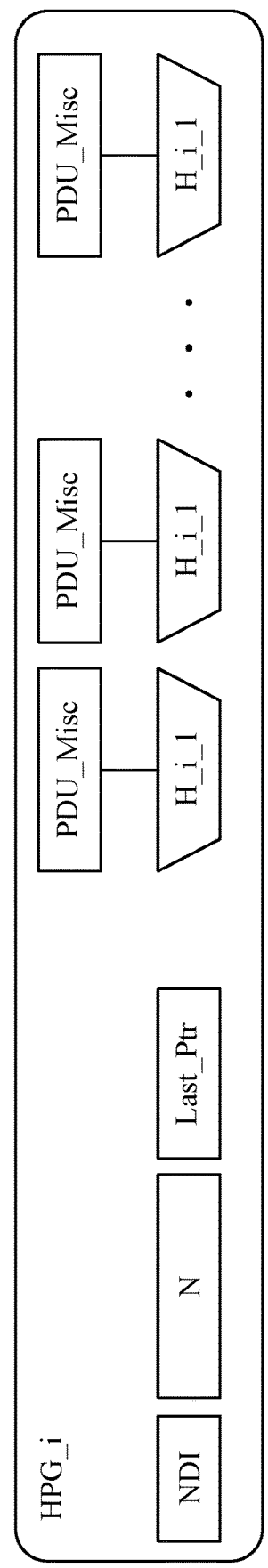
FIG. 3 is a schematic diagram of the data structure of a HARQ process group according to an embodiment of this disclosure.

In this embodiment, the HARQ process groups HPG_0-HPG_7 are included in the spaces divided from the single memory 11b as shown in FIG. 2A. In another embodiment, the HARQ process groups HPG_0-HPG_7 can be included in memories individually. The HARQ process groups HPG_0-HPG_7 respectively have group codes 0-7. Please refer to FIG. 2B and FIG. 3 for the explanation of the data structure of any one of the HARQ process groups HPG_0-HPG_7, wherein FIG. 3 is a schematic diagram of the data structure of the HARQ process group according to an embodiment of this disclosure. As shown in FIG. 3, the HARQ process group HPG_i (i.e. any one of the HARQ process groups HPG_0-HPG_7) as a folder can include one or more HARQ processes H_i_1-H_i_n for transmitting one or more data packets, or include no HARQ process. Each of the HARQ processes H_i_1-H_i_n has a respective group code and a respective process code. For example, the HARQ process H_i_1 has the group code "i" and the process code "1". In one or more embodiments of this disclosure, any one of the HARQ processes H_i_1-H_i_n transmits a data packet to user equipment using its group code as an identifier. Therefore, for the user equipment, there are merely eight parallel processes (i.e. HARQ process groups HPG_0-HPG_7) execute data transmission. In other words, HARQ system 1 is compatible with the existing LTE/4G/5G communication technology.

In an embodiment, the HARQ process group HPG_i includes a new data indicator NDI, a HARQ process quantity N and a last used process code Last_Ptr. The new data indicator NDI indicates whether the data packet that the HARQ process group HPG_i transmits at the present time and the data packet that the HARQ process group HPG_i transmitted at the last time originate from the same raw data such as service data unit (SDU). For example, when the new data indicator NDI is switched from "0" to "1" or from "1" to "0", the data packet that the HARQ process group HPG_i is to transmit is different from the data packet that the HARQ process group HPG_i transmitted at the last time. Therefore, the receiving end of the data packet can determine whether the data packet transmitted by the HARQ process group HPG_i is new data according to the new data indicator of the HARQ process group HPG_i. The HARQ process quantity N indicates the quantity of the HARQ processes H_i_1-H_i_n included in the HARQ process group HPG_i. The last used process code Last_Ptr indicates the process code of the HARQ process which is used to transmit a data packet at the last time. The HARQ process group HPG_i can also include protocol data unit information PDU_Misc for indicating the property such as transmission time, block error rate (BLER) threshold, link control protocol (LCP) property, quality of service class identifier (QCI), delay threshold, radio link control (RLC) mode or another communication property of the data packet carried by each of the HARQ process H_i_1-H_i_n.

For example, the coordinator HPGC and the medium access control scheduler MACS are disposed in the circuit on the LTE/4G/5G chip. The coordinator HPGC is configured to receive a data packet from the medium access control scheduler MACS, wherein the data packet is one of redundancy versions which are generated by cycle redundancy check (CRC), Turbo coding, and dividing. The coordinator HPGC selects one of the HARQ process groups HPG_0-HPG_7 to transmit the data packet when receiving the data packet, and the coordinator HPGC executes a retransmission determining procedure to determine whether to retransmit the and decide the content of the data packet to be retransmitted when receiving the feedback signal in response to the data packet.

Figure 4:
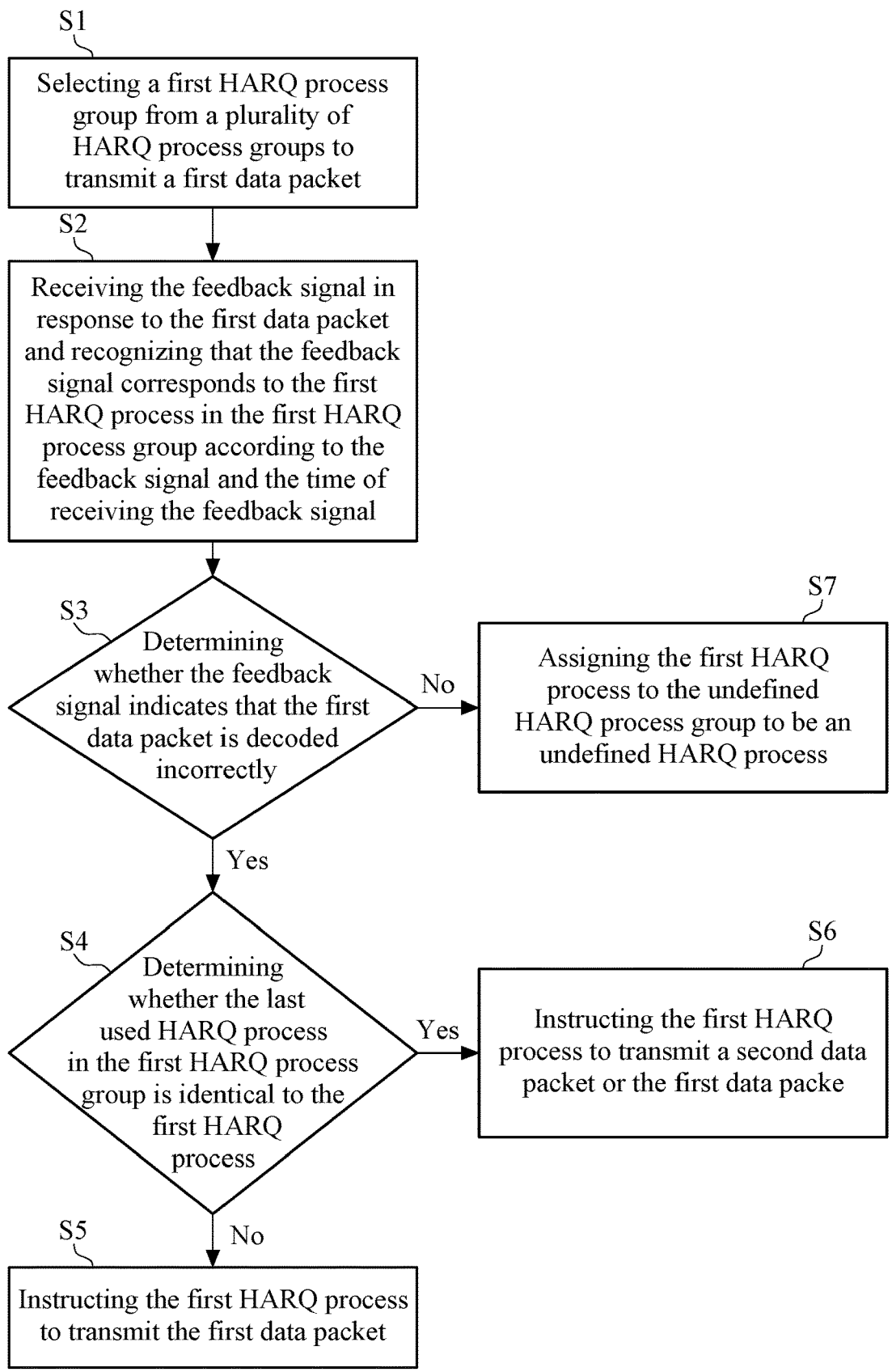
FIG. 4 is a flowchart of a hybrid automatic repeat request method according to an embodiment of this disclosure.

Please refer to FIGS. 2-4 for the particular retransmission determining procedure, wherein FIG. 4 is a flowchart of a hybrid automatic repeat request method according to an embodiment of this disclosure. In step S1, the coordinator HPGC selects a first HARQ process group from the HARQ process groups HPG_0-HPG_7 to transmit a first data packet. More specifically, the coordinator HPGC instructs the first HARQ process in the first HARQ process group to transmit the first data packet to user equipment, and records this transmission event.

The first HARQ process group is selected from the HARQ process groups HPG_0-HPG_7, and has the data structure as shown in FIG. 3, so that the symbol of the first HARQ process group is considered to be "HPG_i" and the symbol of the first HARQ process is considered to be "H_i_1" herein for explanation. In an embodiment, when the coordinator HPGC determines that the SDU to which the first data packet belongs is a new data transmitted for the first time, the coordinator HPGC further switches the new data indicator NDI of the first HARQ process group.

In step S2, when the coordinator HPGC receives the feedback signal in response to the first data packet from the user equipment, the coordinator HPGC recognizes that the feedback signal corresponds to the first HARQ process in the first HARQ process group according to the feedback signal and the time of receiving the feedback signal. More particularly, in an embodiment, the coordinator HPGC derives the corresponding HARQ process (i.e. the first HARQ process H_i_1 in the above embodiment) according to the time of receiving the feedback signal. In another embodiment, the coordinator HPGC determines that the feedback signal is related to the first data packet, and then obtains the information such as process code of the first HARQ process H_i_1 (called as "first process code" in the later description) according to the transmission event recorded in the step S1. In step S3, the coordinator HPGC determines whether the feedback signal indicates that the first data packet is decoded incorrectly. In this embodiment, the feedback signal is ACK signal or NAK (NACK) signal. The ACK signal indicates that the data packet received by the user equipment is decoded correctly, and the NAK signal indicates that the data packet is decoded incorrectly. In another embodiment, the step S3 can be performed before the step S2; that is, the information of the first HARQ process H_i_1 is obtained after the feedback signal is determined to indicate the data packet is decoded correctly or incorrectly.

In step S4, when the feedback signal indicates that the first data packet is decoded incorrectly, the coordinator HPGC determines whether the last used HARQ process in the first HARQ process group is identical to the first HARQ process. More particularly, the coordinator HPGC can determine whether the last used process code Last_Ptr of the first HARQ process group HPG_i is identical to the first process code of the first HARQ process H_i_1, in order to determine whether the last used HARQ process in the first HARQ process group is identical to the first HARQ process.

In an embodiment, the last used process code Last_Ptr of the first HARQ process group HPG_i is different from the first process code of the first HARQ process H_i_1. More particularly, in the period between the step of instructing the first HARQ process H_i_1 in the first HARQ process group HPG_i to transmit the first data packet to the user equipment (i.e. step S1) and the step of receiving the feedback signal in response to the first data packet (i.e. step S2), the coordinator HPGC can further receives another first data packet and selects the first HARQ process group HPG_i again to instruct a second HARQ process H_i_2 in the first HARQ process group HPG_i to transmit said another first data packet, wherein said another first data packet and the first data packet received in the step S1 originated from the different raw data (e.g. SDU). As a result, the last used process code Last_Ptr of the first HARQ process group HPG_i is changed from the first process code of the first HARQ process H_i_1 to the second process code of the second HARQ process H_i_2, and the new data indicator NDI of the first HARQ process group HPG_i is also switched.

At this time, the coordinator HPGC determines that the last used HARQ process in the first HARQ process group HPG_i is different from the first HARQ process, so that in step S5, the coordinator HPGC instructs the first HARQ process H_i_1 to transmit the first data packet again. More particularly, the coordinator HPGC also switches the new data indicator NDI and updates the last used process code Last_Ptr to be the first process code of the first HARQ process H_i_1 when determining the last used HARQ process in the first HARQ process group HPG_i is different from the first HARQ process. In this embodiment, the first data packet belongs to the initial redundancy version of the SDU. In multiple redundancy versions of the SDU, merely the initial redundancy version is generated based on the whole of the SDU (the complete SDU), so that the initial redundancy version can be decoded to obtain the complete SDU. However, other redundancy versions are generated based on a part of the SDU, so that they cannot be decoded to obtain the complete SDU. Moreover, as aforementioned, the HARQ process performs the data transmission using its group code as an identifier. For the user equipment, both of the first data packet and said another first data packet are transmitted by the first HARQ process group HPG_i. Therefore, by switching the new data indicator NDI, the situation that the user equipment considers the first data packet and said another first data packet to be two redundancy versions of a SDU and combines them together but the first data packet and said another first data packet respectively originate from different SDUs in practice may be avoided.

In another embodiment, the coordinator HPGC does not instruct the first HARQ process group to transmit another data packet between the steps S1 and S2, so that the last used process code Last_Ptr of the first HARQ process group is identical to the first process code of the first HARQ process H_i_1. At this time, in step S6, when the last used HARQ process in the first HARQ process group HPG_i is identical to the first HARQ process H_i_1, the coordinator HPGC instructs the first HARQ process H_i_1 to transmit the second data packet which originate from the same SDU as the first data packet does, or to transmit the first data packet again. The second data packet belongs to another redundancy version of the SDU which is generated based on a part of the SDU as aforementioned.

The above two embodiment describes the retransmission procedure performed by the HARQ system 1 when the feedback signal indicates that the first data packet is decoded incorrectly. On the contrary, in step S7, when the feedback signal indicates that the first data packet is decoded correctly, the coordinator HPGC assigns the first HARQ process H_i_1 to the undefined HARQ process group UPG to be an undefined HARQ process.

Figure 5:
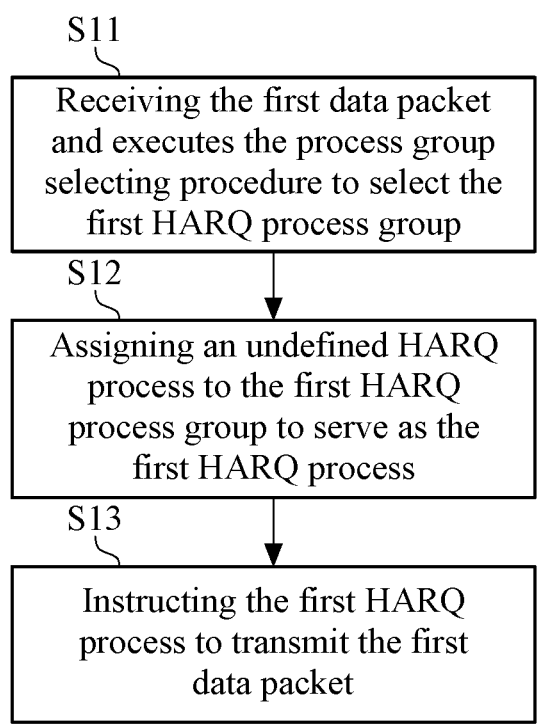
FIG. 5 is a partial flowchart of a hybrid automatic repeat request method according to an embodiment of this disclosure.

In practice, the first HARQ process H_i_1 is generated by defining an undefined HARQ process by the coordinator HPGC. Please refer to FIGS. 2-5, wherein FIG. 5 is a detailing flowchart of the step Si in FIG. 4. In step S11, the coordinator HPGC receives the first data packet and executes the process group selecting procedure to select the first HARQ process group HPG_i, wherein the detailing steps of the process group selecting procedure are described later.

In step S12, the coordinator HPGC assigns an undefined HARQ process to the first HARQ process group HPG_i to serve as the first HARQ process H_i_1 according to the execution result of the process group selecting procedure. More particularly, the coordinator HPGC assigns one of the undefined HARQ processes in the undefined HARQ process group UPG to the selected HARQ process group (i.e. the first HARQ process group HPG_i in this embodiment), defines the assigned undefined HARQ process by setting its group code and process code, and instructs this defined HARQ process to transmit the data packet to the user equipment. The group code is set as the number of the first HARQ process group HPG_i (i.e. "i"), and the process code is set based on the HARQ process quantity N of the first HARQ process group HPG_i before the defined HARQ process is added in the first HARQ process group HPG_i. When the HARQ process quantity N of the first HARQ process group HPG_i is zero, the process code of the defined HARQ process is set as "1"; when the HARQ process quantity N is "n", the process code of the defined HARQ process is set as "n+1".

For example, the fact that process code (first process code) of the first HARQ process H_i_1 is "1" indicates that there is no HARQ process in the first HARQ process group HPG_i when the coordinator HPGC assigns the undefined HARQ process to the first HARQ process group HPG_i. In this embodiment, the first HARQ process H_i_1 is used for an exemplary explanation. However, the process code of the HARQ process is set based on the actual situation of the assignment, which is not limited to the above embodiments. Moreover, the second HARQ process H_i_2 for transmitting said another first data packet in the above embodiment is similarly generated by defining an undefined HARQ process by the coordinator HPGC based on the execution result of the process group selecting procedure, so that the detailing steps are not repeated.

In step S13, the coordinator HPGC instructs the first HARQ process H_i_1 to transmit the first data packet. In an embodiment, the coordinator HPGC records the first process code as the last used process code Last_Ptr of first HARQ process group HPG_i when instructing the first HARQ process H_i_1 to transmit the first data packet.

Figure 6:
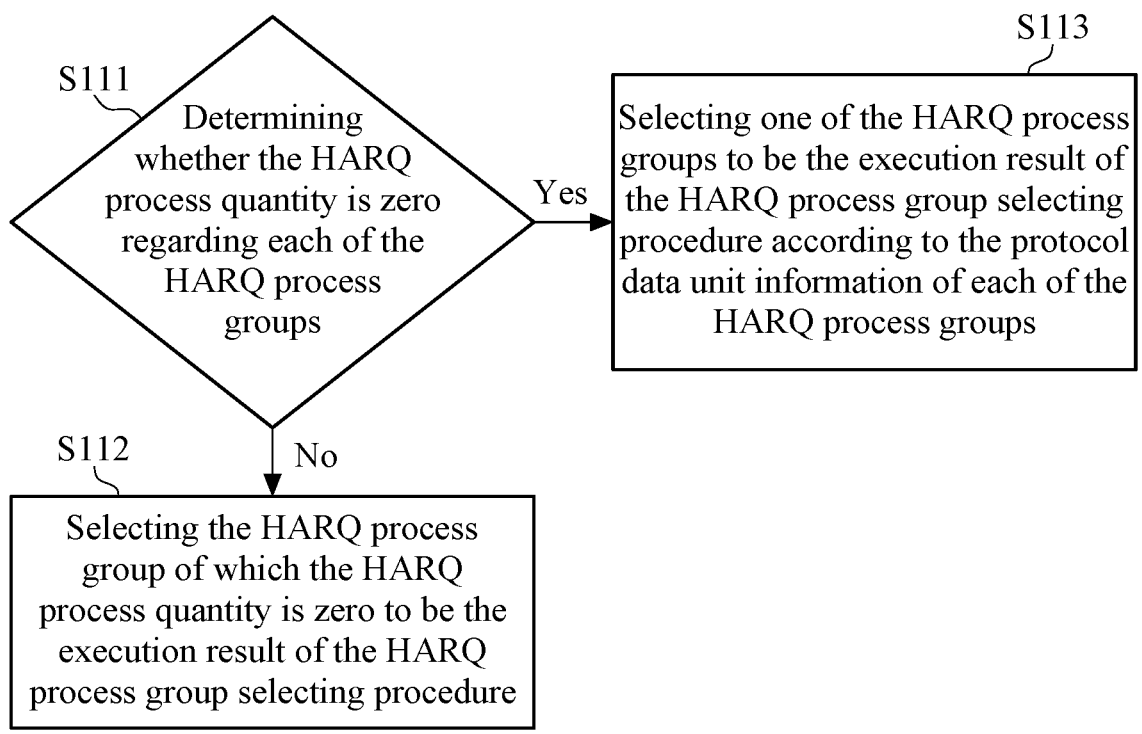
FIG. 6 is a partial flowchart of a hybrid automatic repeat request method according to an embodiment of this disclosure.

Please refer to FIG. 2B, FIG. 3 and FIG. 6, wherein FIG. 6 is a partial flowchart of a HARQ method according to an embodiment of this disclosure. In step S111, the coordinator HPGC determines whether the HARQ process quantity N is zero regarding each of the HARQ process groups HPG_0-HPG_7. In step S112, when the HARQ process quantity N of one or more HARQ process groups of the HARQ process groups HPG_0-HPG_7 is zero, the coordinator HPGC selects the HARQ process group of which the HARQ process quantity N is zero or any one of the HARQ process groups of which the HARQ process quantities N are zero to be the execution result of the HARQ process group selecting procedure. In step S113, when none of the HARQ process quantities N of the HARQ process groups HPG_0-HPG_7 is zero (i.e. the HARQ process quantity N of each of the HARQ process groups HPG_0-HPG_7 is not zero), the coordinator HPGC selects one of the HARQ process groups HPG_0-HPG_7 to be the execution result according to the protocol data unit information PDU_Misc of each of the HARQ process groups HPG_0-HPG_7. In other words, the HARQ process group which includes no HARQ process is preference for the HARQ process group selecting procedure.

As aforementioned, the protocol data unit information PDU_Misc is used for indicating the property of the data packet carried by the HARQ process in the HARQ process group, including one or more of transmission time, BLER threshold, LCP property, QCI, delay threshold, RLC mode and another communication property. For example, the coordinator HPGC prefers the HARQ process group with the lower BLER or less interference during the transmission time, such as the HARQ process group including the enhanced inter-cell interference coordination (eICIC) mechanism. In this example, the error rate of data transmission is low. In another example, the coordinator HPGC prefers the HARQ process group carrying the data packet which belongs to QCI and has the high BLER threshold or higher delay threshold. In yet another example, the coordinator HPGC prefers the HARQ process group carrying the data packet which is generated under an un-acknowledge mode (UM), because the demand for the data completeness during transmission is low under this mode.

Figure 7:
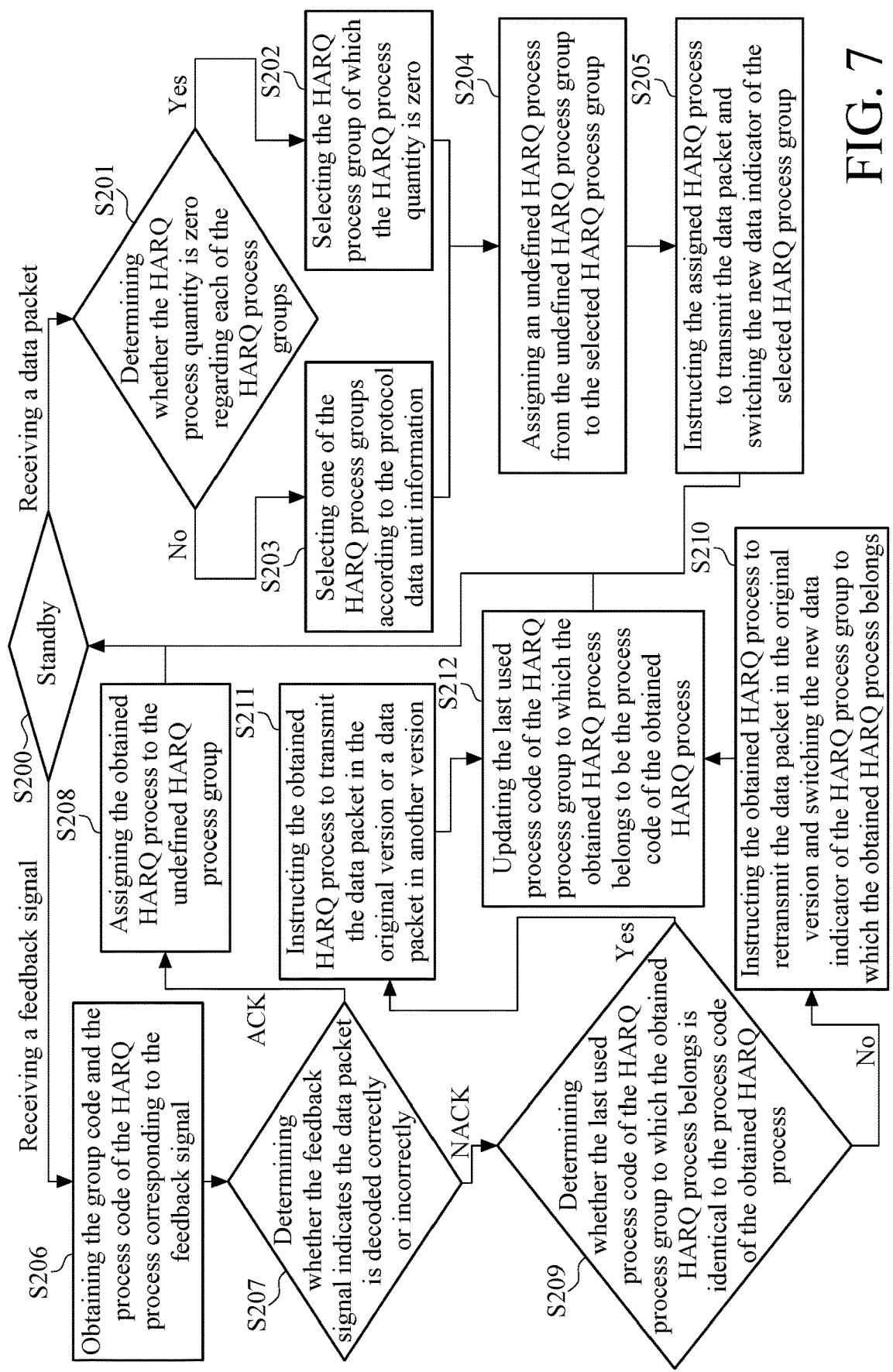
FIG. 7 is a flowchart of a hybrid automatic repeat request method according to another embodiment of this disclosure.

Please refer to FIG. 2B, FIG. 3 and FIG. 7, wherein FIG. 7 is a flowchart of a HARQ method according to another embodiment of this disclosure. The HARQ method comprises a process group selecting procedure (steps S201-S205) and a retransmission determining procedure (steps S206-S211). In step S200, the coordinator HPGC is in the standby state. The coordinator HPGC executes the process group selecting procedure and the data transmission procedure when receiving a data packet from the medium access control scheduler MACS, and executes the retransmission determining procedure when receiving a feedback signal from the user equipment.

In the process group selecting procedure and the data transmission procedure, as described in step S201, the coordinator HPGC determines whether the HARQ process quantity N is zero regarding each of the HARQ process groups HPG_0-HPG_7. In step S202, the coordinator HPGC selects the HARQ process group of which the HARQ process quantity N is zero when the HARQ process quantity N of one or more HARQ process groups of the HARQ process groups HPG_0-HPG_7 is zero. In step S203, the coordinator HPGC does the selection according to the protocol data unit information PDU_Misc when none of the HARQ process quantities N of the HARQ process groups HPG_0-HPG_7 is zero. In steps S204-S205, the coordinator HPGC assigns an undefined HARQ process from the undefined HARQ process group to the selected HARQ process group and instructs this HARQ process assigned by the coordinator HPGC to transmit the data packet, and the coordinator HPGC also determines whether the data packet to be transmitted at the present time and the data packet transmitted at the last time originate from the same SDU or not, so as to selectively switch the new data indicator NDI. More particularly, when the coordinator HPGC determine that the data packet to be transmitted at the present time and the data packet transmitted at the last time originate from the same SDU, the coordinator HPGC switches the new data indicator NDI; otherwise, it does not switch the new data indicator.

During the retransmission determining procedure, as described in steps S206-S207, the coordinator HPGC obtains the group code and the process code of the HARQ process corresponding to the feedback signal, and determines whether the feedback signal indicates the data packet corresponding to the feedback signal is decoded correctly or incorrectly. In step S208, when the feedback signal indicates that the data packet is decoded correctly, the HARQ process of which the group code and the process code are obtained in the step S206 (hereafter called "the obtained HARQ process") is assigned to the undefined HARQ process group to become an undefined HARQ process again. On the contrary, in step S209, when the feedback signal indicates that data packet is decoded incorrectly, the coordinator HPGC determines whether the last used process code Last_Ptr of the HARQ process group to which the obtained HARQ process belongs is identical to the process code of the obtained HARQ process. In step S210, when the determination of the step S209 is negative, the coordinator HPGC instructs the obtained HARQ process to retransmit the data packet in the original version (i.e. data packet corresponding to the feedback signal), and the coordinator HPGC switches the new data indicator NDI of the HARQ process group to which the obtained HARQ process belongs. In step S211, when the determination of the step S209 is positive, the coordinator HPGC instructs the obtained HARQ process to transmit the data packet in the original version or a data packet in another version. In step S212, the last used process code Last_Ptr of the HARQ process group to which the HARQ process belongs is updated to be the process code of the obtained HARQ process.

The above process group selecting procedure and data transmission procedure are approximately the same as the steps in FIGS. 5 and 6, and the retransmission determining procedure is approximately the same as the steps in FIG. 4, so that the related details are not repeated.

Figure 1A:
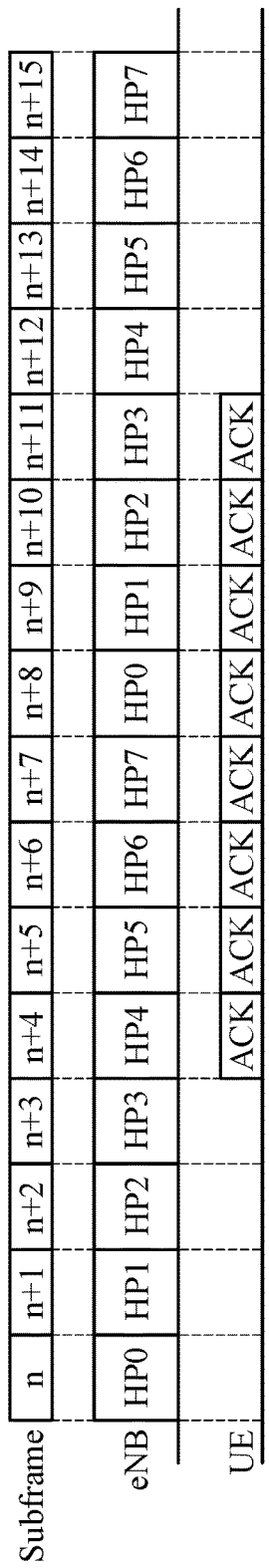
FIGS. 1A-1C are timing diagrams of the transmission of one or more data packets according to the related art.
Figure 1B:
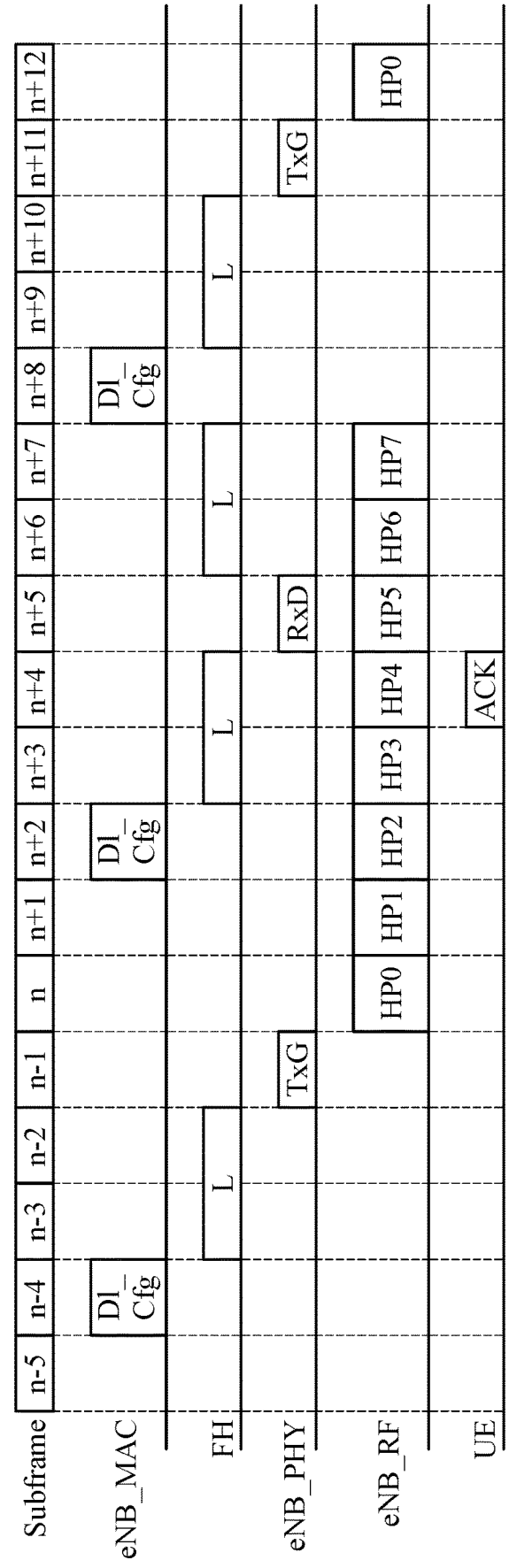
Figure 1C:
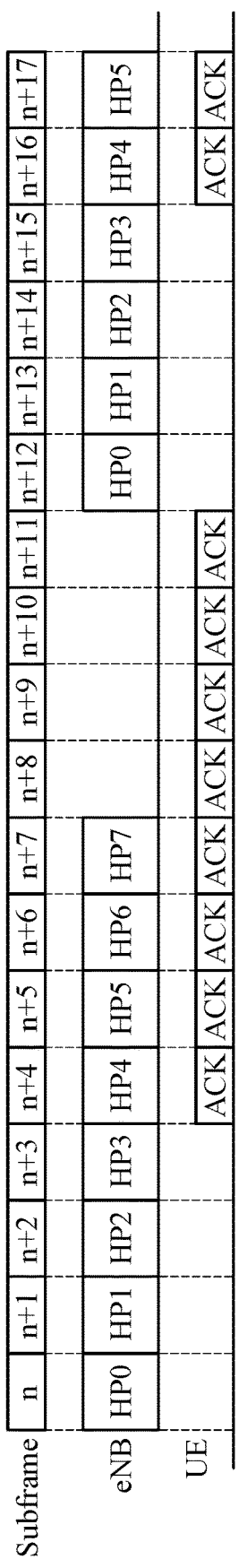

Please refer to FIG. 1C, FIG. 2B and FIG. 8, wherein FIG. 8 is a timing diagram of the transmission of data packet according to an embodiment of this disclosure. In FIG. 1C, the fronthaul latency causes a idle period including subframes n+8-n+11. In comparison with the timing diagram in FIG. 1C, in the subframe n+8 in FIG. 8, the HARQ system 1 can select the HARQ process group HPG_0 by the process group selecting procedure and use the HARQ process HARQ_0_1 in the HARQ process group HPG_0 to transmit data. In the subframes n+9-n+11, the HARQ system 1 performs the steps similar to the above. Therefore, the throughput of single user equipment UE may be increased. It should be noted that the ACK or NAK (NACK) signal sent by the user equipment UE in FIG. 8 is exemplarily illustrated, and does not intend to limit this disclosure.

In view of the above description, the HARQ method and system provided in this disclosure may increase the throughput of single user equipment by disposing a plurality of HARQ process groups which serve as folders, assigning a HARQ process to the selected HARQ process group for data transmission, and executing a retransmission determining procedure according to the information of the HARQ process and the HARQ process group. Moreover, the HARQ method and system provided in this disclosure may be compatible with the present user equipment and highly reliable.

What is claimed is:

1. A hybrid automatic repeat request method for transmitting a piece of raw data, comprising:
   selecting a first HARQ process group from a plurality of HARQ process groups to send a first data packet;
   receiving a feedback signal in response to the first data packet;
   recognizing that the feedback signal corresponds to a first HARQ process in the first HARQ process group according to the feedback signal and a time of receiving the feedback signal;
   determining whether the feedback signal indicates that the first data packet is decoded incorrectly;
   determining whether a last used HARQ process in the first HARQ process group is identical to the first HARQ process when the feedback signal indicates the first data packet is decoded incorrectly;
   instructing the first HARQ process to retransmit the first data packet when the last used HARQ process in the first HARQ process group is different from the first HARQ process; and
   instructing the first HARQ process to transmit a second data packet or the first data packet when the last used HARQ process in the first HARQ process group is identical to the first HARQ process;
   wherein the first data packet is generated based on a whole of the piece of raw data, and the second data packet is generated based on a part of the piece of the raw data.

2. The hybrid automatic repeat request method according to claim 1, wherein selecting the first HARQ process group from the plurality of HARQ process groups to send the first data packet comprises:
   receiving the first data packet and executing a process group selecting procedure to select one of the plurality of HARQ process groups to serve as the first HARQ process group;
   assigning an undefined HARQ process to the first HARQ process group to serve as the first HARQ process; and
   instructing the first HARQ process to transmit the first data packet.

3. The hybrid automatic repeat request method according to claim 2, further comprising:
   receiving another first data packet generated based on a whole of another piece of raw data;
   executing the process group selecting procedure to select the first HARQ process group from the plurality of HARQ process groups;
   assigning another undefined HARQ process to the first HARQ process group to serve as a second HARQ process; and
   instructing the second HARQ process to transmit said another first data packet.

4. The hybrid automatic repeat request method according to claim 3, further comprising:
   switching a new data indicator of the first HARQ process group when the second HARQ process transmits said another first data packet; and
   switching the new data indicator of the first HARQ process group when the last used HARQ process in the first HARQ process group is different from the first HARQ process.

5. The hybrid automatic repeat request method according to claim 2, wherein the process group selecting procedure comprises:

determining a number of HARQ processes of each of the plurality of HARQ process groups;

selecting one of the plurality of HARQ process groups to be an execution result when the number of HARQ processes of said one of the plurality of HARQ process groups is zero; and selecting one of the plurality of HARQ process groups to be the execution result according to protocol data unit information of each of the plurality of HARQ process groups when the number of HARQ processes of each of the plurality of HARQ process groups is not zero.

6. The hybrid automatic repeat request method according to claim 1, further comprising:

assigning the first HARQ process to an undefined HARQ process group to be an undefined HARQ process when the feedback signal indicates the first data packet is decoded correctly.

7. A hybrid automatic repeat request system, configured for transmitting a piece of raw data, and comprising:

at least one memory, comprising:
an undefined HARQ process group, storing a plurality of undefined HARQ processes; and
a plurality of HARQ process groups; and a coordinator, connected with the at least one memory, selecting a first HARQ process group from the plurality of HARQ process groups, assigning one of the plurality of undefined HARQ processes to the first HARQ process group to serve as a first HARQ process, and instructing the first HARQ process to transmit a first data packet, with the coordinator configured to receive a feedback signal in response to the first data packet, determining that the feedback signal corresponds to the first HARQ process according to the feedback signal and a time of receiving the feedback signal, determining whether the feedback signal indicates that the first data packet is decoded incorrectly, determining whether a last used HARQ process in the first HARQ process group is identical to the first HARQ process when the feedback signal indicates the first data packet is decoded incorrectly, instructing the first HARQ process to retransmit the first data packet when the last used HARQ process in the first HARQ process group is different from the first HARQ process, and instructing the first HARQ process to transmit a second data packet or the first data packet when the last used HARQ process in the first HARQ process group is identical to the first HARQ process, wherein the first data packet is generated based on a whole of the piece of raw data, and the second data packet is generated based on a part of the piece of the raw data.

8. The hybrid automatic repeat request system according to claim 7, wherein the coordinator further executes a process group selecting procedure to select the first HARQ process group to select the first HARQ process group from the plurality of HARQ process groups, and during the process group selecting procedure, the coordinator determines a number of HARQ processes of each of the plurality of HARQ process groups, selects one of the plurality of HARQ process groups to be an execution result when the number of HARQ processes of said one is zero, and selects one of the plurality of HARQ process groups to be the execution result according to protocol data unit information of each of the plurality of HARQ process groups when the number of HARQ processes of each of the plurality of HARQ process is not zero.

9. The hybrid automatic repeat request system according to claim 8, wherein the coordinator further receives another first data packet generated based on a whole of another piece of raw data, executes the process group selecting procedure to select the first HARQ process group from the plurality of HARQ process groups, assigns another one of the plurality of undefined HARQ processes to the first HARQ process group to serve as a second HARQ process, and instructs the second HARQ process to transmit said another first data packet.

10. The hybrid automatic repeat request system according to claim 9, wherein each of the plurality of HARQ process groups comprises a new data indicator, the coordinator switches the new data indicator of the first HARQ process group when instructing the second HARQ process to transmit said another first data packet or determining the last used HARQ process in the first HARQ process group is different from the first HARQ process.

11. The hybrid automatic repeat request system according to claim 7, wherein the coordinator further assigning the first HARQ process to the undefined HARQ process group when the feedback signal indicates the first data packet is decoded correctly.

* * * * *